(12) United States Patent
Van Epps, Jr.

(10) Patent No.: US 7,602,309 B2
(45) Date of Patent: Oct. 13, 2009

(54) METHODS, ELECTRONIC DEVICES, AND COMPUTER PROGRAM PRODUCTS FOR MANAGING DATA IN ELECTRONIC DEVICES RESPONSIVE TO WRITTEN AND/OR AUDIBLE USER DIRECTION

(75) Inventor: Daniel J. Van Epps, Jr., Apex, NC (US)

(73) Assignee: Sony Ericsson Mobile Communications AB, Lund (SE)

( * ) Notice: Subject to any disclaimer, the term of this patent is extended or adjusted under 35 U.S.C. 154(b) by 751 days.

(21) Appl. No.: 11/108,263

(22) Filed: Apr. 18, 2005

(65) Prior Publication Data

US 2006/0236022 A1 Oct. 19, 2006

(51) Int. Cl.
*G08B 5/00* (2006.01)

(52) U.S. Cl. .................. 340/815.4; 340/573.1; 345/179

(58) Field of Classification Search .................. 340/300, 340/815.4, 815.45, 815.46, 573.1; 711/100; 345/179, 1.1, 618; 704/275; 708/131; 382/181, 382/187, 189

See application file for complete search history.

(56) References Cited

U.S. PATENT DOCUMENTS

| | | | | |
|---|---|---|---|---|
| 4,957,031 | A * | 9/1990 | Kondo et al. .................. 84/613 |
| 5,347,477 | A * | 9/1994 | Lee ............................. 708/141 |
| 5,581,783 | A | 12/1996 | Ohashi | |
| 5,874,947 | A | 2/1999 | Lin | |
| 5,875,448 | A | 2/1999 | Boys et al. | |
| 5,943,603 | A | 8/1999 | Parulski et al. | |
| 6,003,072 | A | 12/1999 | Gerritsen et al. | |
| 6,088,262 | A * | 7/2000 | Nasu ..................... 365/185.04 |
| 6,167,523 | A * | 12/2000 | Strong ......................... 726/21 |
| 6,188,432 | B1 | 2/2001 | Ejima | |
| 6,853,710 | B2 * | 2/2005 | Harris ................... 379/142.01 |
| 7,219,302 | B1 * | 5/2007 | O'Shaughnessy et al. ... 715/752 |
| 2002/0091526 | A1 | 7/2002 | Kiessling et al. | |
| 2003/0052922 | A1 | 3/2003 | Hidai | |
| 2003/0160825 | A1 | 8/2003 | Weber | |
| 2003/0204403 | A1 | 10/2003 | Browning | |
| 2004/0117358 | A1 | 6/2004 | von Kaenel et al. | |

FOREIGN PATENT DOCUMENTS

EP 1489485 A2 12/2004

OTHER PUBLICATIONS

Invitation to Pay Additional Fees from the International Searching Authority corresponding to PCT/US2005/041727 mailed on May 5, 2006.

Atkins et al. "Integrated Web and Telephone Service Creation" *Bell Labs Technical Journal* pp. 19-35 (1997).

Notification of Transmittal of the International Search Report and The Written Opinion of the International Searching Authority, or the Declaration corresponding to PCT/US2005/041727 mailed on Jun. 28, 2006.

* cited by examiner

*Primary Examiner*—Anh V La
(74) *Attorney, Agent, or Firm*—Myers Bigel Sibley & Sajovec, PA

(57) ABSTRACT

A method of managing data stored in an electronic device includes determining a desired memory storage location for data displayed on the electronic device responsive to a written and/or audible user direction, and then transferring the data to the desired memory storage location responsive to the determination. The written user direction may define at least one alphanumeric character and/or symbol on a display of the electronic device, and the audible user direction may provide a spoken/voice command. Related electronic devices and computer program products are also discussed.

32 Claims, 6 Drawing Sheets

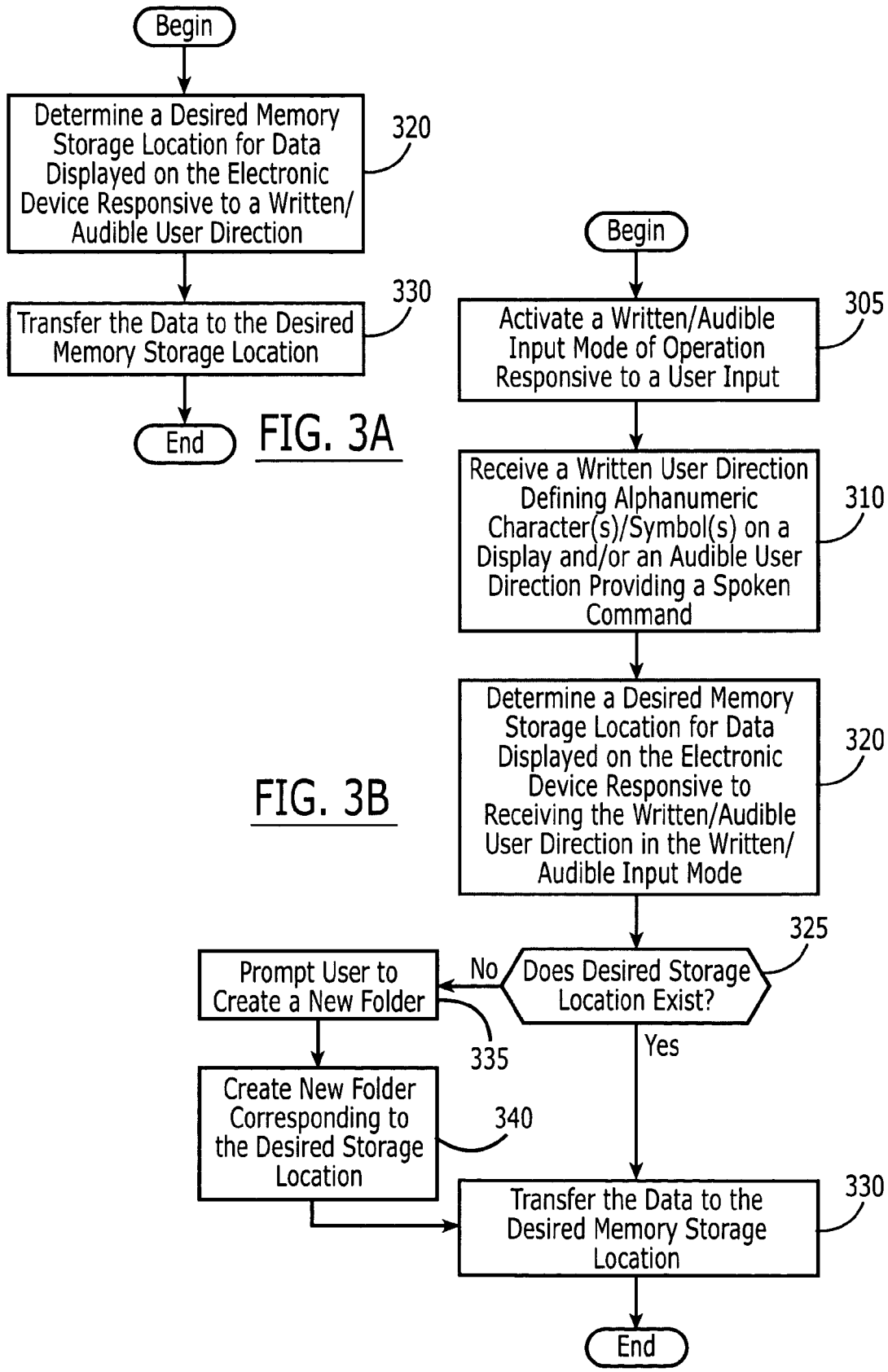

METHODS, ELECTRONIC DEVICES, AND COMPUTER PROGRAM PRODUCTS FOR MANAGING DATA IN ELECTRONIC DEVICES RESPONSIVE TO WRITTEN AND/OR AUDIBLE USER DIRECTION

BACKGROUND OF THE INVENTION

The present invention relates to electronic devices and methods of operating the same, and, more particularly, to methods of managing data in electronic devices.

Electronic devices, such as mobile terminals, increasingly provide a variety of communications, multimedia, and/or data processing capabilities. For example, mobile terminals, such as cellphones, personal digital assistants, and/or laptop computers, may provide storage and/or access to data in a wide variety of multimedia formats, including text, pictures, music, and/or video.

However, particularly in mobile terminals, data stored therein can be difficult to manage due to the limited input devices provided by the mobile terminal. In contrast to desktop computers, mobile terminals generally do not include a mouse for manipulating on-screen data using, for example, a drag-and-drop process. Rather, mobile terminals typically rely on a touch screen and/or a keypad for data manipulation. The keypad may include mechanically actuated alphanumeric keys aligned, for example, as in a standard computer keyboard so as to enable conventional typing for entering alphanumeric characters. The touch screen may be a transparent pressure sensitive film that is disposed over a liquid crystal display (LCD) displaying data, virtual buttons, and/or other virtual command selections such as menus, check boxes and lists. Data displayed on the LCD is typically manipulated by applying pressure to the LCD using a hand-held stylus. However, either alternative may present difficulties in selecting and/or manipulating on-screen data.

For example, many mobile terminals, such as cellphones, may be equipped with digital camera functionality. Yet, when an image captured using the digital camera is displayed on the mobile terminal, it may be difficult to select and/or manipulate the displayed image using the keypad. For instance, although particular keys on the keypad may be assigned to specific image manipulation functions, such an interface may not be immediately intuitive to a user. Alternatively, while it may be easier to select the image using a touch screen and/or stylus, it may still be difficult to manipulate and/or store the image. For example, the touch screen interface may require navigation of a series of on-screen menus for image manipulation, which may obscure the displayed image and/or negate the selection.

SUMMARY OF THE INVENTION

In some embodiments of the present invention, a method of managing data stored in a electronic device includes determining a desired memory storage location for data displayed on the electronic device responsive to a written and/or audible user direction, and transferring the data to the desired memory storage location responsive to the determination.

In other embodiments of the present invention, the desired storage location may be determined responsive to receiving a written user direction defining at least one alphanumeric character and/or symbol on a display of the electronic device and/or receiving an audible user direction providing a spoken and/or voice command. For example, receiving a written user direction defining at least one alphanumeric character and/or symbol may include receiving a written user input including writing the at least one alphanumeric character and/or symbol on the display of the electronic device using a stylus. Alternatively, receiving a written direction may include receiving a written user input including moving a cursor displayed on the electronic device using a mouse, trackball, and/or joystick to define the at least one alphanumeric character and/or symbol.

In still other embodiments of the present invention, the desired memory storage location may be determined responsive to receiving the written and/or audible user direction in a written and/or audible input mode of operation. The written and/or audible input mode of operation may be activated responsive to a user input including at least one of pressing a button on the electronic device, selecting an icon displayed on the electronic device, and/or navigating at least one on-screen menu displayed on the electronic device. The written and/or audible user direction may then be received after activating the written and/or audible input mode of operation.

In still other embodiments of the present invention, the desired storage location for the data may be determined responsive to a written user direction including grouping the data and writing at least one alphanumeric character and/or symbol in the grouping. For example, the desired storage location for the data may be determined responsive to drawing a polygon and/or ellipse around the data and writing the at least one alphanumeric character and/or symbol in the polygon and/or ellipse.

In other embodiments of the present invention, the electronic device may be a first electronic device. Transferring the data to the desired memory storage location may include transmitting the data to a desired memory storage location in a second electronic device. For example, the data may be transmitted via a radio-frequency, infrared, and/or wired connection to the second electronic device. The second electronic device may be a removable memory card, a desktop personal computer, and/or a file-share server/website.

In still other embodiments of the present invention, transferring the data to the desired memory storage location may include prompting a user to create a new folder if a desired memory storage location cannot be determined responsive to the written and/or audible user direction. The new folder may be created responsive to a user response to the prompt. The data may then be transferred to the new folder.

In some embodiments of the present invention, an electronic device includes a memory device, a display, and a processor coupled to the memory device and the display. The processor is configured to determine a desired memory storage location in the memory device for data displayed on the display and transfer the data to the desired memory storage location responsive to a written and/or audible user direction.

In other embodiments of the present invention, the audible user direction may include a voice command. The electronic device may further include a microphone coupled to the processor and operable to receive the voice command.

In still other embodiments of the present invention, the written user direction may include defining at least one alphanumeric character and/or symbol on the display of the electronic device. The electronic device may further include a pointing device operable to define the at least one alphanumeric character and/or symbol on the display. For example, the pointing device may be a stylus configured to be used with the display, and the written user direction may include writing the at least one alphanumeric character and/or symbol on the display of the electronic device using the stylus. Alternatively, the pointing device may be at least one of a mouse, trackball, and/or joystick, and the written user direction may include moving a cursor displayed on the display using the mouse, trackball, and/or joystick to define the at least one alphanumeric character and/or symbol.

In other embodiments of the present invention, the processor may be configured to determine the desired memory storage location responsive to a written user direction including grouping the data and writing the at least one alphanumeric character and/or symbol in the grouping using the pointing device. For example, the processor may be configured to determine the desired memory storage location responsive to a written user direction including drawing a polygon and/or ellipse around the data and writing the at least one alphanumeric character and/or symbol in the polygon and/or ellipse using the pointing device.

In still other embodiments of the present invention, the processor may be configured to activate a written and/or audible input mode of operation. The desired storage location may be determined responsive to receiving the written and/or audible user direction in the written and/or audible input mode of operation. The electronic device may include a keypad coupled to the processor, and the processor may be configured to activate the written and/or audible input mode of operation responsive to at least one of pressing a button on the keypad, selecting an icon displayed on the display, and/or navigating an on-screen menu displayed on the display.

In still other embodiments of the present invention, the electronic device may be a first electronic device. The electronic device may further include a transceiver configured to transmit the data to a desired memory storage location in a second electronic device. For example, the second electronic device may be at least one of a removable memory card, a desktop personal computer, and/or a file-share server/website. The transceiver may be further configured to transmit the data via a radio-frequency, infrared, and/or wired connection.

In other embodiments of the present invention, if a desired memory storage location cannot be determined responsive to the written and/or audible user direction, the processor may be further configured to prompt a user to create a new folder. The processor may be configured to create the new folder responsive to a user response, and then transfer the data to the new folder.

Although described above primarily with respect to method and electronic device aspects of the present invention, it will be understood that the present invention may be embodied as methods, electronic devices, and/or computer program products.

BRIEF DESCRIPTION OF THE DRAWINGS

FIGS. 3A and 3B are flowcharts that illustrate exemplary operations of a mobile terminal for managing data stored therein in accordance with some embodiments of the present invention.

DETAILED DESCRIPTION OF EXEMPLARY EMBODIMENTS

Figure 1:
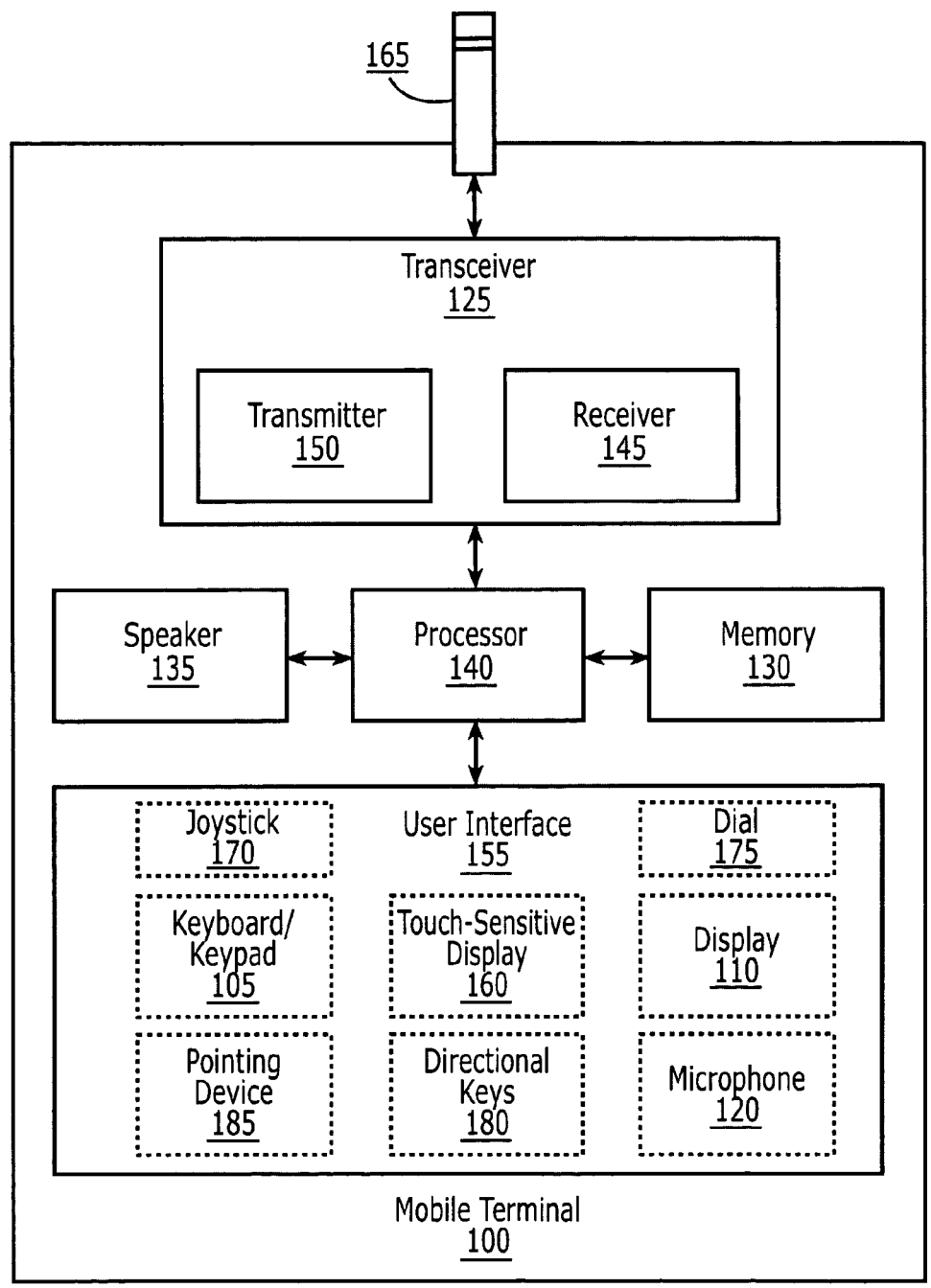
FIG. 1 is a block diagram that illustrates a mobile terminal in accordance with some embodiments of the present invention.

Specific exemplary embodiments of the invention now will be described with reference to the accompanying drawings. This invention may, however, be embodied in many different forms and should not be construed as limited to the embodiments set forth herein; rather, these embodiments are provided so that this disclosure will be thorough and complete, and will fully convey the scope of the invention to those skilled in the art. The terminology used in the detailed description of the particular exemplary embodiments illustrated in the accompanying drawings is not intended to be limiting of the invention. In the drawings, like numbers refer to like elements.

As used herein, the singular forms "a," "an," and "the" are intended to include the plural forms as well, unless expressly stated otherwise. It should be further understood that the terms "comprises" and/or "comprising" when used in this specification is taken to specify the presence of stated features, integers, steps, operations, elements, and/or components, but does not preclude the presence or addition of one or more other features, integers, steps, operations, elements, components, and/or groups thereof. It will be understood that when an element is referred to as being "connected" or "coupled" to another element, it can be directly connected or coupled to the other element or intervening elements may be present. Furthermore, "connected" or "coupled" as used herein may include wirelessly connected or coupled. As used herein, the term "and/or" includes any and all combinations of one or more of the associated listed items, and may be abbreviated as "/".

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

The present invention may be embodied as methods, electronic devices, and/or computer program products. Accordingly, the present invention may be embodied in hardware and/or in software (including firmware, resident software, micro-code, etc.). Furthermore, the present invention may take the form of a computer program product on a computer-usable or computer-readable storage medium having computer-usable or computer-readable program code embodied in the medium for use by or in connection with an instruction execution system. In the context of this document, a computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. More specific examples (a nonexhaustive list) of the computer-readable medium would include the following: an electrical connection having one or more wires, a portable computer diskette, a random access memory (RAM), a read-only memory (ROM), an erasable programmable read-only memory (EPROM or Flash memory), an optical fiber, and a compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

As used herein, the term "mobile terminal" may include a satellite or cellular radiotelephone with or without a multi-line display; a Personal Communications System (PCS) terminal that may combine a cellular radiotelephone with data processing, facsimile and data communications capabilities; a PDA that can include a radiotelephone, pager, Internet/intranet access, Web browser, organizer, calendar and/or a global positioning system (GPS) receiver; and a conventional laptop and/or palmtop receiver or other appliance that includes a radiotelephone transceiver. Mobile terminals may also be referred to as "pervasive computing" devices.

For purposes of illustration, embodiments of the present invention are described herein in the context of a mobile terminal. It will be understood, however, that the present invention is not limited to such embodiments and may be embodied generally as any electronic device, mobile or stationary, that includes data storage functionality.

Some embodiments of the present invention may stem from a realization that moving data to desired folders and/or other memory storage locations in electronic devices can be difficult, especially in mobile terminals having relatively small displays and limited input devices. According to some embodiments of the present invention, existing hardware and/or software in a mobile terminal may be configured to determine a desired memory storage location for data displayed on the mobile terminal and transfer the data to the desired memory storage location responsive to a written and/or audible user direction. Thus, data management in the mobile terminal may be facilitated.

FIG. 1 is a block diagram illustrating a mobile terminal in accordance with some embodiments of the present invention. Referring now to FIG. 1 an exemplary mobile terminal 100 includes a transceiver 125, memory 130, a speaker 135, a processor 140, and a user interface 155. The transceiver 125 typically includes a transmitter circuit 150 and a receiver circuit 145 which cooperate to transmit and receive radio frequency signals to and from base station transceivers via an antenna 165. The radio frequency signals transmitted between the mobile terminal 100 and the base station transceivers may include both traffic and control signals (e.g., paging signals/messages for incoming calls), which are used to establish and maintain communication with another party or destination. The radio frequency signals may also include packet data information, such as, for example, cellular digital packet data (CDPD) information. In addition, the transceiver 125 may include an infrared (IR) transceiver configured to transmit/receive infrared signals to/from other electronic devices via an IR port. The memory 130 may represent a hierarchy of memory that may include volatile and/or non-volatile memory, such as removable flash, magnetic, and/or optical rewritable non-volatile memory. The processor 140 is coupled to the transceiver 125, the memory 130, the speaker 135, and the user interface 155. The processor 140 may be, for example, a commercially available or custom microprocessor that is configured to coordinate and manage operations of the transceiver 125, the memory 130, the speaker 135, and/or the user interface 155.

As noted above, the mobile terminal 100 may further comprise a user interface 155 coupled to the processor 140. The user interface 155 may include a microphone 120, a display 110 (such as a liquid crystal display), a joystick 170, a keyboard/keypad 105, a touch sensitive display 160, a dial 175, a directional key(s) 180, and/or a pointing device 185 (such as a mouse, trackball, touch pad, etc.). For example, the pointing device 185 may be operable to define alphanumeric characters/symbols on the display 110, and the microphone 120 may be operable to receive spoken and/or voice commands. However, depending on functionalities offered by the mobile terminal 100, additional and/or fewer elements of the user interface 155 may actually be provided. For instance, the touch sensitive display 160 may be provided in a PDA that does not include a display 110, a keypad 105, and/or a pointing device 185. The touch sensitive display 160 may display a plurality of virtual command and/or control buttons. When application programs are launched and/or executed on the PDA, the command/control buttons may be selected by touching a stylus on the touch sensitive display 160 at the appropriate location(s) of the virtual buttons shown on the touch sensitive display 160. The foregoing components of the mobile terminal 100 may be included in many conventional mobile terminals and their functionality is generally known to those skilled in the art.

Figure 2:
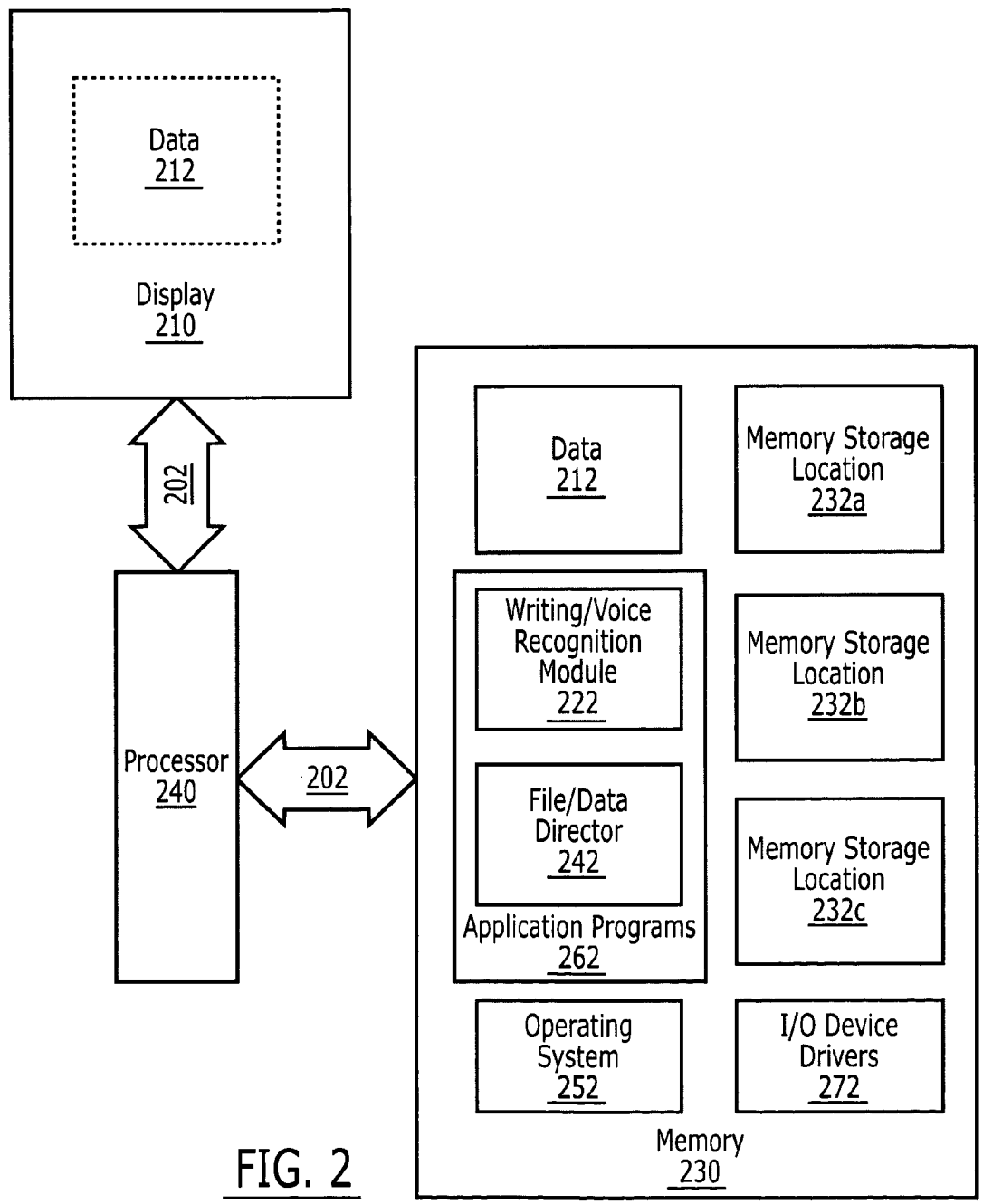
FIG. 2 is a block diagram that illustrates a hardware/software architecture for managing data stored in a mobile terminal in accordance with some embodiments of the present invention.

FIG. 2 illustrates a hardware/software architecture including a display 210, a memory device 230, and a processor 240 that may be used for managing data stored in an electronic device, such as the mobile terminal 100 of FIG. 1, according to some embodiments of the present invention. In some embodiments, the processor 240, memory 230, and display 210 may respectively correspond to the processor 140, memory 130, and display 110 of the mobile terminal 100 of FIG. 1.

Referring now to FIG. 2, the processor 240 is configured to communicate with the memory 230 and the display 210 via an address/data bus 202. The display 210 may be configured to display data 212 that is stored in the memory 230. The data 212 may include various multimedia data, such as text, pictures, video, and/or music, in a variety of formats. More particularly, the data 212 may include text messages, e-mail, sports scores, horoscopes, sound clips, heart rate readings, stopwatch times, and/or any other data which may be stored and/or accessed using a mobile terminal based on the functionality included therein. As shown in FIG. 2, the memory 230 may also be configured to store several categories of software, such as an operating system 252, applications programs 262, and input/output (I/O) device drivers 272. The operating system 252 controls the management and/or operation of system resources and may coordinate execution of programs by the processor 240. The I/O device drivers 272 typically include software routines accessed through the operating system 252 by the application programs 262 to communicate with input/output devices, such as those included in the user interface 155 of FIG. 1, and/or other components of the memory 230. The memory 230 further includes a plurality of memory storage locations 232a to 232c in which the data 212 and/or other data may be stored.

The application programs 262 are illustrative of programs that implement various features according to embodiments of the present invention, and preferably include at least one application which supports operations for managing data stored in the memory 230. More particularly, the application programs 262 may include a writing/voice recognition module 222 and a file/data director 242. The processor 240 may be configured to use the writing/voice recognition module 222 and the file/data director 242 to determine a desired memory storage location for the data 212 that is displayed on the display 210 and transfer the data 212 to the desired memory storage location responsive to a written and/or audible user direction. For example, an audible user direction, such as a voice command, may be received at a microphone coupled to the processor 240, such as the microphone 120 of FIG. 1. The voice command may indicate that the data 212 is to be saved in a particular folder. Responsive to receiving the voice command via the microphone, the processor 240 may use the writing/voice recognition module 222 to convert the voice command into data that may be interpreted by the processor 240, and may thereby determine that the desired storage location for the data 212 is memory storage location 232*a*. The processor 240 may then transfer the data 212 to the determined memory storage location 232*a* using the file/data director 242.

Alternatively, a written user direction defining one or more alphanumeric characters and/or symbols may be received at the processor 240 via the display 210. For example, the display 210 may be a touch sensitive display, such as the touch sensitive display 160 of FIG. 1, and the alphanumeric characters/symbols may be written on the display 210 using a stylus or other pointing device configured to be used with the display 210, such as the pointing device 185. The written alphanumeric characters/symbols may be concurrently displayed on the display 210. In some embodiments, the written alphanumeric characters/symbols may be referred to as "graffiti." As a further alternative, the alphanumeric characters/symbols may be defined by moving a cursor displayed on the display 210 using a mouse, trackball, and/or joystick coupled to the processor 240. Responsive to receiving the alphanumeric characters/symbols, the processor 240 may use the writing/voice recognition module 222 to convert the alphanumeric characters/symbols into data that may be interpreted by the processor 240, and may thereby determine that the desired storage location for the data 212 is memory storage location 232*b*. The processor may then use the file/data director 242 to transfer the displayed data 212 to the desired memory storage location 232*b*. Moreover, a variety of written and/or audible user directions may be provided. For example, the written user direction may also define a grouping for the data 212, such as by drawing a polygon and/or ellipse around the data 212. The alphanumeric characters/symbols may then be written in the grouping using the pointing device to designate the desired storage location.

In addition, the processor 240 may be configured to receive the written and/or audible user direction in a written and/or audible input mode of operation that is activated responsive to a user input, such as pressing a button on the keypad coupled to the processor 240, selecting an icon on the display 210, and/or navigating an on-screen menu on the display 210. Furthermore, a transceiver, such as the transceiver 125 of FIG. 1, may be configured to transmit the data 212 to a desired memory storage location in another electronic device. For example, the data may be transmitted to a desired storage location in a removable memory card, a desktop personal computer, and/or a file-share server for posting on a file-share website using a wired, infrared (IR), and/or radio-frequency (RF) connection.

Although FIG. 2 illustrates an exemplary hardware/software architecture that may be used in mobile terminals and/or other electronic devices for managing data stored therein, it will be understood that the present invention is not limited to such a configuration but is intended to encompass any configuration capable of carrying out operations described herein. For example, although the memory 230 is illustrated as separate from the processor 240, the memory 230 or portions thereof may be considered as a part of the processor 240. More generally, while particular functionalities are shown in particular blocks by way of illustration, functionalities of different blocks and/or portions thereof may be combined, divided, and/or eliminated. Moreover, the functionality of the hardware/software architecture of FIG. 2 may be implemented as a single processor system or a multi-processor system in accordance with various embodiments of the present invention.

Computer program code for carrying out operations of devices and/or systems discussed above with respect to FIG. 2 may be written in a high-level programming language, such as Java, C, and/or C++, for development convenience. In addition, computer program code for carrying out operations of embodiments of the present invention may also be written in other programming languages, such as, but not limited to, interpreted languages. Some modules or routines may be written in assembly language or even micro-code to enhance performance and/or memory usage. It will be further appreciated that the functionality of any or all of the program modules may also be implemented using discrete hardware components, one or more application specific integrated circuits (ASICs), or a programmed digital signal processor or microcontroller.

The present invention is described hereinafter with reference to flowchart and/or block diagram illustrations of methods, mobile terminals, electronic devices, data processing systems, and/or computer program products in accordance with some embodiments of the invention.

These flowchart and/or block diagrams further illustrate exemplary operations of managing data stored in electronic devices in accordance with various embodiments of the present invention. It will be understood that each block of the flowchart and/or block diagram illustrations, and combinations of blocks in the flowchart and/or block diagram illustrations, may be implemented by computer program instructions and/or hardware operations. These computer program instructions may be provided to a processor of a general purpose computer, a special purpose computer, or other programmable data processing apparatus to produce a machine, such that the instructions, which execute via the processor of the computer or other programmable data processing apparatus, create means for implementing the functions specified in the flowchart and/or block diagram block or blocks. These computer program instructions may also be stored in a computer usable or computer-readable memory that may direct a computer or other programmable data processing apparatus to function in a particular manner, such that the instructions stored in the computer usable or computer-readable memory produce an article of manufacture including instructions that implement the function specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions that execute on the computer or other programmable apparatus provide steps for implementing the functions specified in the flowchart and/or block diagram block or blocks.

FIGS. 3A and 3B are flowcharts that illustrate exemplary operations of a mobile terminal for managing data stored therein in accordance with some embodiments of the present invention.

Referring now to FIG. 3A, operations for managing data stored in an electronic device, such as a mobile terminal in accordance with some embodiments of the present invention, begin at block 320 where a desired memory storage location for data displayed on the electronic device is determined responsive to a written and/or audible user direction. For example, the desired storage location may be determined responsive to receiving a written user direction defining at least one alphanumeric character and/or symbol on a display of the electronic device. Alternatively, the desired storage location may be determined responsive to receiving an audible user direction providing a spoken/voice command. At block 330, the data displayed on the electronic device is then transferred to the desired memory storage location. The desired memory storage location may be a memory location in the memory of the electronic device, or alternatively, in a second electronic device connected to the electronic device via a radio-frequency, infrared, and/or wired connection. For example, the second electronic device may be a removable memory card, a desktop computer, and/or a file-share server/ website. Advantageously, in accordance with some embodiments of the present invention, data stored in the electronic device may easily be transferred to a desired storage location based on a written and/or audible user direction.

Additional operations for managing data stored in electronic devices according to some embodiments of the present invention will now be described with reference to FIG. 3B. As shown in FIG. 3B, operations begin at block 305 where a written and/or audible input mode of operation is activated responsive to a user input. For example, the written and/or audible input mode may be activated responsive to pressing a button on the electronic device, selecting an icon, and/or navigating at least one on-screen menu displayed on the electronic device. At block 310, a written and/or audible user direction is received in the written and/or audible input mode of operation. The audible user direction may be a spoken/ voice command, while the written user direction may define at least one alphanumeric character and/or symbol on the display of the electronic device. For example, the written user direction may be a written user input defining the alphanumeric character(s) and/or symbol(s) by writing on the display of the device using a stylus. Alternatively, the written user direction may be a written user input defining the alphanumeric character(s) and/or symbol(s) by moving a cursor displayed on the electronic device using a mouse, trackball, joystick, and/or other input device. In addition, the written user direction may include grouping the data, such as by drawing a polygon and/or ellipse around the data, and then writing the alphanumeric character(s)/symbol(s) in the grouping to designate the desired storage location.

Still referring to FIG. 3B, a desired memory storage location is determined for data that is displayed on the electronic device at block 320. The desired memory storage location is determined responsive to the written and/or audible user direction received in the written and/or audible input mode of operation. As such, written and/or audible input that is received when not in the written and/or audible input mode of operation may not be used to determine a desired memory storage location, which may prevent unintended data transfer. For example, a desired memory storage location may not be determined if a user inadvertently speaks within a proximity of the electronic device when not in the written and/or audible input mode of operation. Similarly, if a user inadvertently defines an alphanumeric character and/or symbol by touching the display and/or moving a pointing device when not in the written and/or audible input mode of operation, data may not be transferred responsive to the user input. If the desired memory storage location exists and/or can be determined based on the written and/or audible user direction in the written and/or audible input mode of operation (block 325), the data is transferred to the desired memory location at block 330.

However, if the desired storage location does not exist and/or cannot be determined based on the written and/or audible user direction (block 325), a user is prompted to create a new folder at block 335, and the new folder is created at block 340 based on the user's response. As such, the new folder corresponds to a desired memory storage location. The data is then transferred to the newly created folder at block 330.

The flowcharts of FIGS. 3A and 3B illustrate the architecture, functionality, and operations of embodiments of hardware and/or software in electronic devices, such as mobile terminals, according to some embodiments of the present invention. In this regard, each block represents a module, segment, or portion of code, which comprises one or more executable instructions for implementing the specified logical function(s). It should also be noted that in other implementations, the function(s) noted in the blocks may occur out of the order noted in FIGS. 3A and 3B. For example, two blocks shown in succession may, in fact, be executed substantially concurrently or the blocks may sometimes be executed in the reverse order, depending on the functionality involved.

Figure 4A:
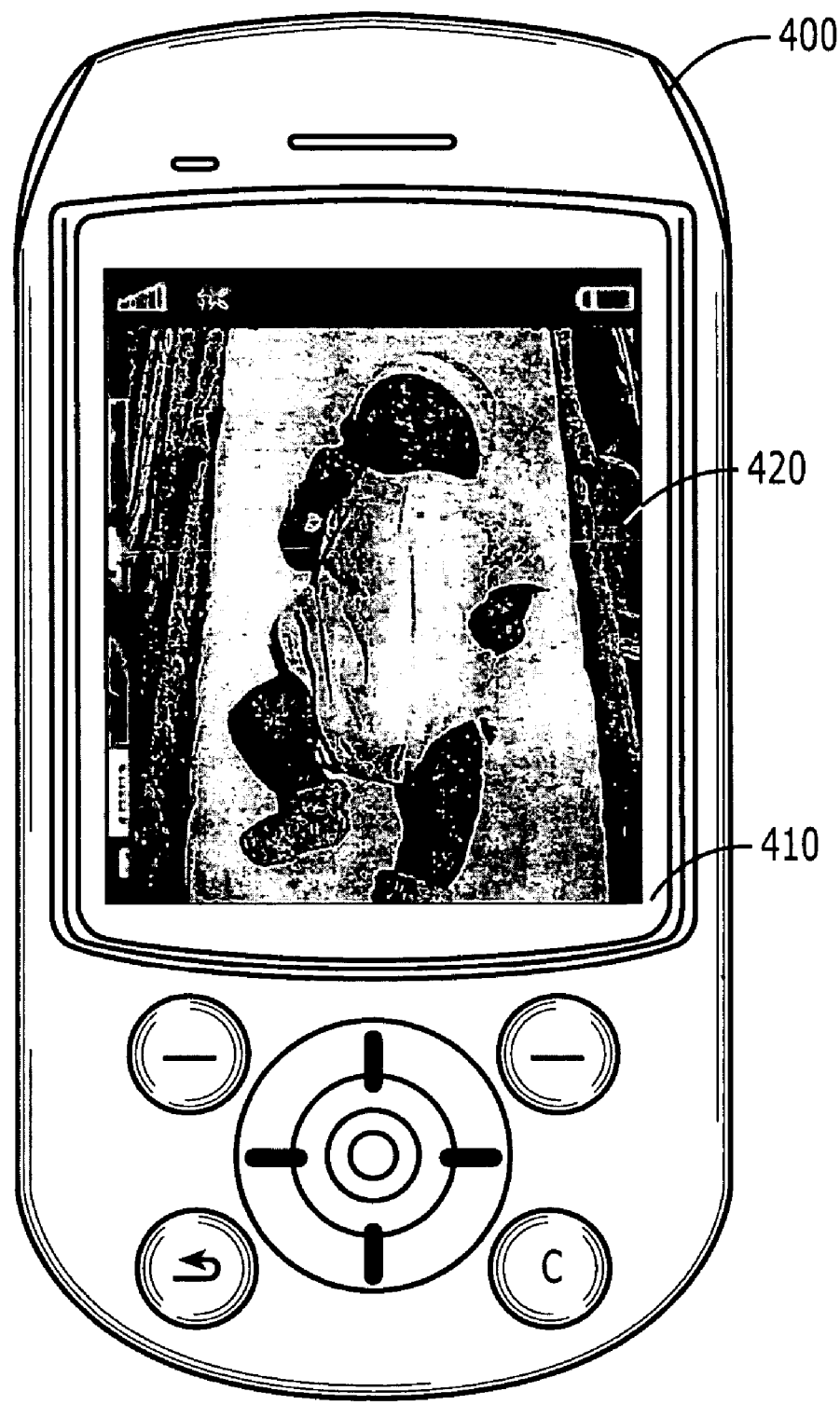
FIGS. 4A to 4C illustrate exemplary operations for managing data as performed in a mobile terminal in accordance with some embodiments of the present invention.
Figure 4B:
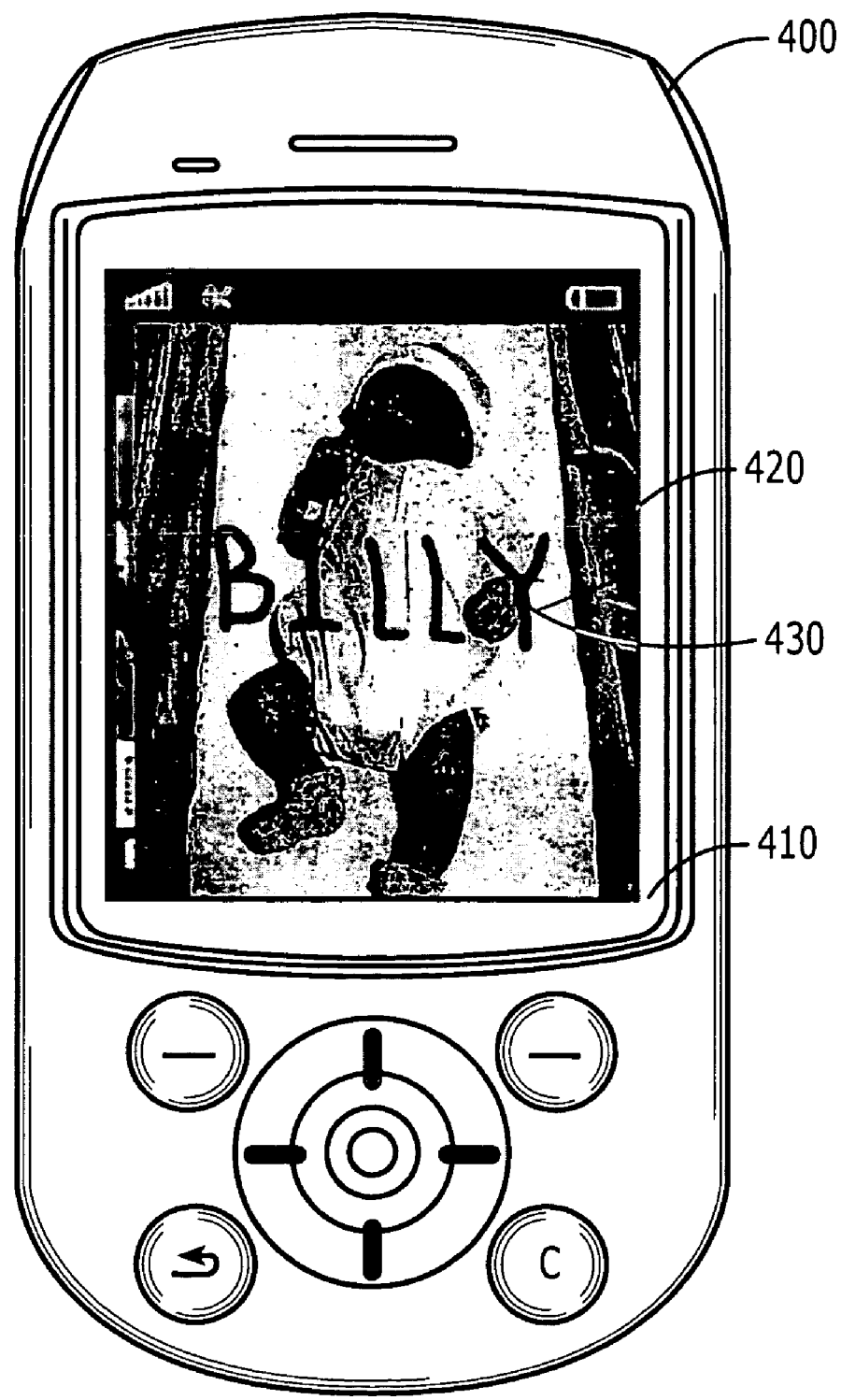
Figure 4C:
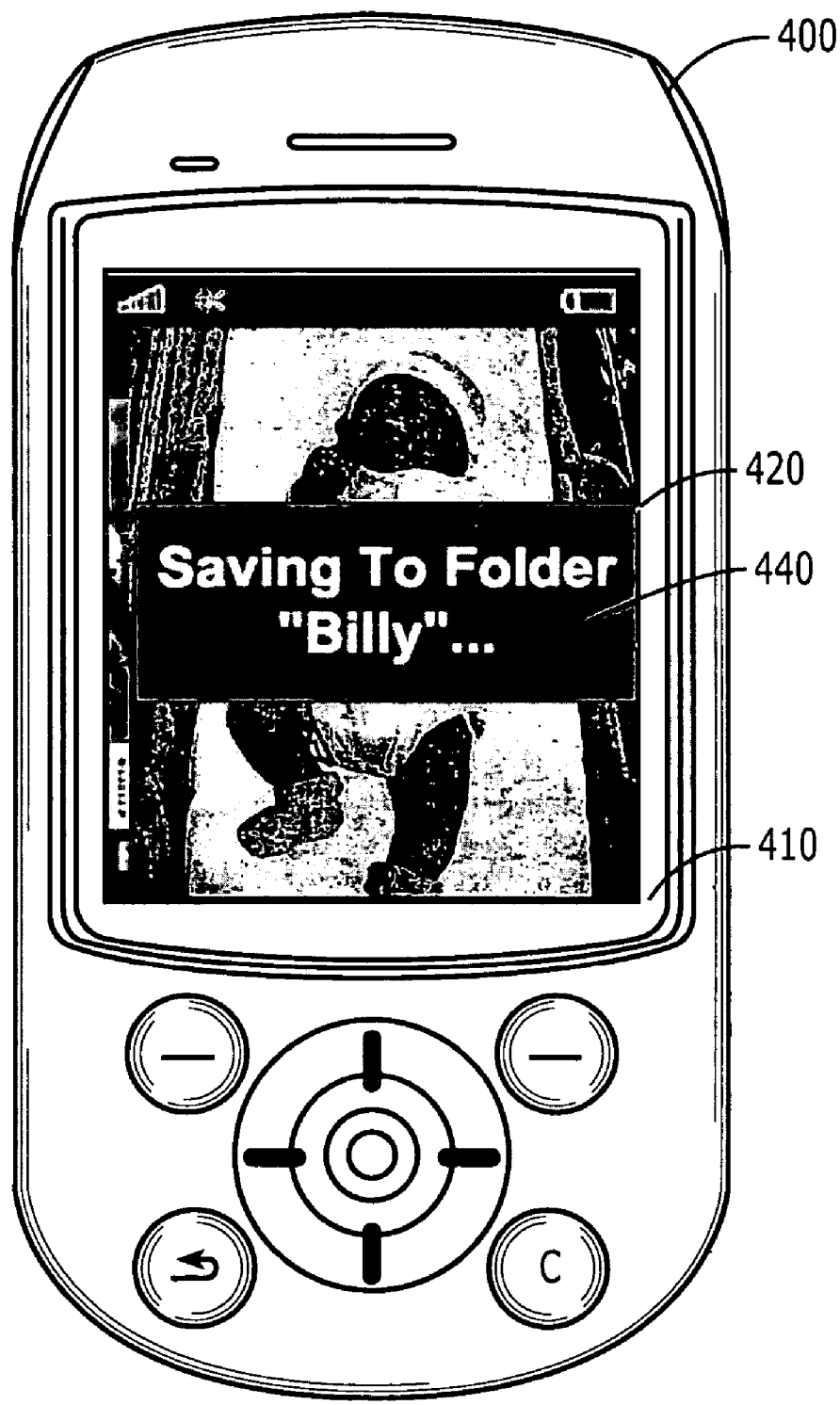

FIGS. 4A to 4C illustrate exemplary operations for managing data as performed in a mobile terminal in accordance with some embodiments of the present invention. Referring to FIG. 4A, a mobile terminal 400 including digital camera functionality is used to capture an image 420. The captured image 420 is shown on the display 410 of the mobile terminal 400. The display 410, for example, may be a touch sensitive display including a transparent pressure sensitive film disposed over a liquid crystal display (LCD).

As shown in FIG. 4B, a user of the mobile terminal 400 then provides a written user direction 430 defining one or more alphanumeric characters and/or symbols on the display 410. More particularly, the user writes the word "BILLY" on the image 420 shown on the display 410 using a stylus and/or other pointing device configured to be used with the display 410. Hardware and/or software inside the mobile terminal 400 converts the alphanumeric characters into data that is interpretable by a processor in the mobile terminal 400, which determines that the desired memory storage location for the image 420 is a folder named "Billy" in the memory of the mobile terminal 400.

Then, as illustrated in FIG. 4C, the image 420 is transferred to the desired storage location (i.e., the folder named "Billy" in the mobile terminal memory) responsive to the determination. As the image 420 is transferred, a user notification 440 is displayed on the display 410. More specifically, the notification "Saving to Folder 'Billy' . . . " is shown on the display 410. As such, the user is notified that the data transfer was successful and that the destination folder was properly recognized. Thus, in accordance with some embodiments of the present invention, images and/or other data stored in a mobile terminal and/or other electronic device can be easily be transferred to a desired memory storage location responsive to written and/or audible user direction.

In the drawings and specification, there have been disclosed exemplary embodiments of the invention. However, many variations and modifications can be made to these embodiments without substantially departing from the principles of the present invention. Accordingly, although specific terms are used, they are used in a generic and descriptive sense only and not for purposes of limitation, the scope of the invention being defined by the following claims.

That which is claimed:

1. A method of managing data stored in a electronic device, the method comprising:
    electronically identifying a user input written on a display of the electronic device as a written user direction to transfer data displayed on the electronic device, the written user input defining at least one alphanumeric character;

determining a desired memory storage location for the data displayed on the electronic device responsive to the written user direction, wherein the desired memory storage location corresponds to the alphanumeric character defined by the written user input; and transferring the data displayed on the electronic device to the desired memory storage location responsive to the determination.

2. The method of claim 1, further comprising:
receiving the written user input comprising writing the at least one alphanumeric character and/or a symbol on the display of the electronic device via a stylus.

3. The method of claim 1, wherein receiving the written user input defining at least one alphanumeric character and/or symbol comprises:
receiving the written user input comprising moving a cursor displayed on the electronic device using a mouse, trackball, and/or joystick to define the at least one alphanumeric character and/or symbol.

4. The method of claim 1, wherein determining a desired memory storage location comprises:
determining the desired memory storage location responsive to receiving the written user input in a written input mode of operation.

5. The method of claim 4, wherein receiving the written user input in a written input mode of operation comprises:
activating the written input mode of operation responsive to a user input comprising at least one of pressing a button on the electronic device, selecting an icon displayed on the electronic device, and/or navigating at least one on-screen menu displayed on the electronic device; and then
receiving the written user input.

6. The method of claim 1, wherein determining a desired memory storage location comprises:
determining the desired storage location for the data responsive to the written user input comprising grouping the data and writing the at least one alphanumeric character and/or symbol in the grouping.

7. The method of claim 6, wherein determining the desired storage location for the data responsive to grouping the data comprises:
determining the desired storage location for the data responsive to a written user input comprising drawing a polygon and/or ellipse around the data and writing the at least one alphanumeric character and/or symbol in the polygon and/or ellipse.

8. The method of claim 1, wherein the electronic device comprises a first electronic device, and wherein transferring the data to the desired memory storage location comprises:
transmitting the data to a desired memory storage location in a second electronic device.

9. The method of claim 8, wherein transmitting the data comprises:
transmitting the data via a radio-frequency, infrared, and/or wired connection to the second electronic device, wherein the second electronic device comprises at least one of a removable memory card, a desktop personal computer, and/or a file-share server/website.

10. The method of claim 1, wherein transferring the data to the desired memory storage location comprises:
prompting a user to create a new folder if a desired memory storage location cannot be determined responsive to the written user direction;
creating the new folder responsive to a user response; and then
transferring the data to the new folder.

11. An electronic device, comprising:
a memory device;
a display; and
a processor coupled to the memory device and the display and configured to identify a written user input that defines at least one alphanumeric character on a display of the electronic device as a written user direction to transfer data displayed on the electronic device, determine a desired memory storage location in the memory device for the data displayed on the display, and transfer the data displayed on the display to the desired memory storage location responsive to the written user direction, wherein the desired memory storage location corresponds to the alphanumeric character defined by the written user input.

12. The electronic device of claim 11, further comprising:
a microphone coupled to the processor and operable to receive an audible user input.

13. The electronic device of claim 11, further comprising:
a pointing device operable to define the at least one alphanumeric character and/or a symbol on the display.

14. The electronic device of claim 13, wherein the pointing device comprises a stylus configured to be used with the display, and wherein the written user input comprises writing the at least one alphanumeric character and/or symbol on the display of the electronic device using the stylus.

15. The electronic device of claim 13, wherein the pointing device comprises at least one of a mouse, trackball, and/or joystick, and wherein the written user input comprises moving a cursor displayed on the display using the mouse, trackball, and/or joystick to define the at least one alphanumeric character and/or symbol.

16. The electronic device of claim 13, wherein the processor is configured to determine the desired memory storage location responsive to the written user input comprising grouping the data and writing the at least one alphanumeric character and/or symbol in the grouping using the pointing device.

17. The electronic device of claim 16, wherein the processor is configured to determine the desired memory storage location responsive to the written user input comprising drawing a polygon and/or ellipse around the data and writing the at least one alphanumeric character and/or symbol in the polygon and/or ellipse using the pointing device.

18. The electronic device of claim 11, wherein the processor is configured to activate a written input mode of operation and determine the desired storage location responsive to receiving the written user input in the written input mode of operation.

19. The electronic device of claim 18, further comprising:
a keypad coupled to the processor,
wherein the processor is configured to activate the written input mode of operation responsive to at least one of pressing a button on the keypad, selecting an icon displayed on the display, and/or navigating an on-screen menu displayed on the display.

20. The electronic device of claim 11, wherein the electronic device comprises a first electronic device, and further comprising:
a transceiver configured to transmit the data to a desired memory storage location in a second electronic device.

21. The electronic device of claim 20, wherein the second electronic device comprises at least one of a removable memory card, a desktop personal computer, and/or a file-share server/website, and wherein the transceiver is further configured to transmit the data via a radio-frequency, infrared, and/or wired connection.

22. The electronic device of claim 11, wherein the processor is further configured to prompt a user to create a new folder, create the new folder responsive to a user response, and transfer the data to the new folder if a desired memory storage location cannot be determined responsive to the written user direction.

23. A computer program product for managing data stored in an electronic device, the computer program product comprising:
   a computer readable storage medium having computer readable program code embodied in the medium, the computer readable program code comprising:
   computer readable program code configured to electronically identify a user input written on a display of the electronic device as a written user direction to transfer data displayed on the electronic device, the written user input defining at least one alphanumeric character;
   computer readable program code configured to determine a desired memory storage location for the data displayed on the electronic device responsive to the written user direction, wherein the desired memory storage location corresponds to the alphanumeric character defined by the written user input; and
   computer readable program code configured to transfer the data displayed on the electronic device to the desired memory storage location responsive to the determination.

24. The computer program product of claim 23, further comprising:
   computer readable program code configured to receive the at least one alphanumeric character and/or a symbol that is defined by writing on the display of the electronic device using a stylus.

25. The computer program product of claim 23, further comprising:
   computer readable program code configured to receive the at least one alphanumeric character and/or symbol that is defined by moving a cursor displayed on the electronic device using a mouse, trackball, and/or joystick.

26. The computer program product of claim 23, further comprising:
   computer readable program code configured to receive the written user input in a written input mode of operation.

27. The computer program product of claim 26, further comprising:
   computer readable program code configured to activate the written input mode of operation responsive to a user input comprising at least one of pressing a button on the electronic device, selecting an icon displayed on the electronic device, and/or navigating at least one on-screen menu displayed on the electronic device.

28. The computer program product of claim 23, wherein computer readable program code configured to determine a desired memory storage location comprises:
   computer readable program code configured to determine the desired storage location for the data responsive to the written user input comprising grouping the data and writing at least one alphanumeric character and/or symbol in the grouping.

29. The computer program product of claim 28, wherein computer readable program code configured to determine a desired storage location for the data responsive to a written user direction grouping the data comprises:
   computer readable program code configured to determine the desired storage location for the data responsive to the written user input comprising drawing a polygon and/or ellipse around the data and writing the at least one alphanumeric character and/or symbol in the polygon and/or ellipse.

30. The computer program product of claim 23, wherein the electronic device comprises a first electronic device, and wherein computer readable program code configured to transfer the data to the desired memory storage location comprises:
   computer readable program code configured to transmit the data to a desired memory storage location in a second electronic device.

31. The computer program product of claim 30, wherein computer readable program code configured to transmit the data comprises:
   computer readable program code configured to transmit the data via a radio-frequency, infrared, and/or wired connection to the second electronic device, wherein the second electronic device comprises at least one of a removable memory card, a desktop personal computer, and/or a file-share server/website.

32. The computer program product of claim 23, wherein computer readable program code configured to transfer the data to the desired memory storage location comprises:
   computer readable program code configured to prompt a user if a desired memory storage location cannot be determined responsive to the written user direction;
   computer readable program code configured to create a new folder responsive to a user response; and
   computer readable program code configured to transfer the data to the new folder.

\* \* \* \* \*

UNITED STATES PATENT AND TRADEMARK OFFICE
CERTIFICATE OF CORRECTION

PATENT NO.        : 7,602,309 B2                                             Page 1 of 1
APPLICATION NO.   : 11/108263
DATED             : October 13, 2009
INVENTOR(S)       : Daniel J. Van Epps, Jr.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1046 days.

Signed and Sealed this

Fifth Day of October, 2010

David J. Kappos
*Director of the United States Patent and Trademark Office*